US009709664B2

(12) United States Patent
Persson et al.

(10) Patent No.: US 9,709,664 B2
(45) Date of Patent: Jul. 18, 2017

(54) APPARATUS, SYSTEMS AND METHODS FOR MOBILE NETWORK POSITIONING OF MTC DEVICES USING PARTIAL POWER BOOSTING

(71) Applicant: Sony Corporation, Tokyo (JP)

(72) Inventors: Magnus Persson, Lund (SE); Basuki Priyanto, Lund (SE); Peter C. Karlsson, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 74 days.

(21) Appl. No.: 14/719,436

(22) Filed: May 22, 2015

(65) Prior Publication Data

US 2016/0291128 A1  Oct. 6, 2016

Related U.S. Application Data

(63) Continuation of application No. PCT/EP2015/056900, filed on Mar. 30, 2015.

(51) Int. Cl.
*H04W 4/00* (2009.01)
*G01S 5/10* (2006.01)
(Continued)

(52) U.S. Cl.
CPC .............. *G01S 5/10* (2013.01); *H04W 4/005* (2013.01); *H04W 4/023* (2013.01); *H04W 52/38* (2013.01); *H04W 64/00* (2013.01)

(58) Field of Classification Search
CPC . H04W 64/00; H04W 64/003; H04W 64/006; H04W 28/0215; H04W 4/005; H04W 4/023; H04W 52/38; G01S 5/10
(Continued)

(56) References Cited

U.S. PATENT DOCUMENTS

| | | | | |
|---|---|---|---|---|
| 2010/0271965 | A1* | 10/2010 | Siomina | H04L 5/0048 370/252 |
| 2011/0143773 | A1* | 6/2011 | Kangas | G01S 5/02 455/456.1 |
| 2014/0301305 | A1* | 10/2014 | Xu | H04L 5/0053 370/329 |

FOREIGN PATENT DOCUMENTS

WO     2012023894 A1     2/2012

OTHER PUBLICATIONS

Intel Corporation; "Remaining Details of Deployment Scenarios and Evaluation Methodology", 3GPP Draft; R1-150241, 3rd Generation Partnership Project (3GPP), Mobile Competence Centre ; 650, Route des Lucioles; F-06921 Sophia-Antipolis Cedex ; France, vol. RAN WG1, No. Athens, Greece; Feb. 9, 2015-Feb. 13, 2015, Jan. 31, 2015, pp. 1-5, XP050948911, Retrieved from the Internet: URL:http://www.3gpp.org/ftp/tsg_ran/WG1_RL   1/TSGR1 80/Docs/ [retrieved on Jan. 31, 2015].
(Continued)

*Primary Examiner* — Sai-Ming Chan
(74) *Attorney, Agent, or Firm* — James C. Edwards; Moore & Van Allen, PLLC

(57) ABSTRACT

The invention is directed to systems, methods and computer program products for modifying Positioning Reference Signal (PRS) transmissions from base stations to User Equipment (UE) by providing for partial power boosting at the base stations with the purpose of improving UE positioning accuracy and, specifically positioning accuracy of Machine Type Communication (MTC) devices.

16 Claims, 4 Drawing Sheets

(51) Int. Cl.
　　　*H04W 4/02*　　　(2009.01)
　　　*H04W 52/38*　　　(2009.01)
　　　*H04W 64/00*　　　(2009.01)
(58) Field of Classification Search
　　　USPC .......................................................... 370/328
　　　See application file for complete search history.

(56) References Cited

OTHER PUBLICATIONS

International Search Report and Written Opinion; Jan. 14, 2016; issued in International Patent Application No. PCT/EP2015/056900.

* cited by examiner

APPARATUS, SYSTEMS AND METHODS FOR MOBILE NETWORK POSITIONING OF MTC DEVICES USING PARTIAL POWER BOOSTING

FIELD OF THE INVENTION

In general, embodiments of the invention relate to mobile communication network communications and, more particularly, modifying positioning reference signal (PRS) transmissions from base stations to User Equipment (UE) by providing for partial power boosting at the base stations with the purpose of improving UE positioning accuracy and, specifically positioning accuracy of Machine Type Communication (MTC) devices.

BACKGROUND

Machine Type Communications (MTC) is gaining interest in mobile communication industries. It is projected there will be billions of MTC devices to support Machine to Machine (M2M) devices, in addition to Human to Human (H2H) communications. M2M defines a broad label that can be used to describe any technology that enables networked devices to exchange information and perform actions without the manual assistance of humans. Recently, MTC has been discussed in many standardization bodies, including 3GPP ($3^{rd}$ Generation Partnership Project). In the current stage, 3GPP is specifying low cost and enhanced coverage MTC in LTE (Long-Term Evolution) telecommunications. MTC has some benefits over legacy wireless communication technologies, such as conventional mobile communication devices and the like, in particular MTC/M2M devices tend to exhibit low power consumption and are intended to be low cost devices. Specifically, MTC is defined to be operated with a maximum bandwidth of 1.4 MHz (Mega Hertz), which is relatively smaller than legacy LTE devices, such as conventional mobile communication devices that are operated in up to a 20 MHz bandwidth without carrier aggregation.

MTC can be applied to many applications or use-cases, for examples smart meters, vending machines, various types of sensors (including human body sensors), tracking devices, etc. Positioning in an MTC device is important, especially when there is a need to locate the device for inventory purpose and emergency localization.

3GPP standardization has defined positioning techniques (i.e., determining current location of the device) for LTE telecommunications since LTE release 9. However, positioning techniques that are suitable and designed for MTC devices have not yet been defined. While in many instances MTC devices will be generally stationary devices, in other use cases, the MTC devices may be mobile devices and, in such use cases, the knowledge of the device's position may be equally as important as positioning of legacy UE, such as conventional mobile communication devices. The fact that MTC devices, according to 3GPP Rel-13, are being defined to operate with a maximum bandwidth of 1.4 MHz poses unique problems associated with obtaining accurate positioning.

Therefore, a need exists to develop apparatus, systems, methods and the like that will improve UE positioning accuracy and, specifically positioning accuracy of Machine Type Communication (MTC) devices.

BRIEF SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for modifying Positioning Reference Signal (PRS) transmissions from base stations to User Equipment (UE) by providing for partial power boosting at the base stations with the purpose of improving UE positioning accuracy and, specifically positioning accuracy of Machine Type Communication (MTC) devices.

The LTE cellular system is currently deployed with a bandwidth in the range of 10 MHz or 20 MHz. In such a system, PRS signals are prevalent throughout the bandwidth but the signal Power Spectral Density (PSD) is low. Since MTC devices operate in the narrow 1.4 MHz bandwidth, such devices are only capable of utilizing the minimal amount of PRS signals transmitted within the 1.4 MHz bandwidth. Embodiments of the present invention, provide for partial power boosting at the base station (also commonly referred to as eNode-B, base transceiver station or the like) so that the power boost increases signal PSD within a specified amount of Resources Blocks (RB) (e.g., 6 RB or the like) or within a narrow bandwidth (e.g., 1.4 MHz or the like) around DC (Direct Current) subcarrier (i.e., a subcarrier not containing data).

In specific embodiments of the invention, the partial power boosting at the base station is pre-configured and remains constant. While in other embodiments of the invention, the partial power boosting is dynamic. In such embodiments, the base stations in the network may be configured to incrementally increase the power boost level if the current positioning accuracy does not reach an acceptable level.

Moreover, in other specific embodiments of the invention, since in most instances the base station is required to maintain the same transmit power, the base station may be configured to implement both power boosting and power-de-boosting as the means for compensating for higher power in certain resource blocks due to the power boosting. In specific embodiments, power de-boosting may be allocated to partial resource blocks at the edges of the operating bandwidth, or, in alternate embodiments, the de-boosting can be configured to be distributed to all of the other resource blocks (i.e., all of the resources except those being subjected to the partial power boost).

In other embodiments of the invention, in addition to increasing the PSD by partial power boosting or in lieu of partial power boosting, the base station may be configured to increase the volume of PRS signals by transmitting a specified timeframe of sub-frames of device-specific PRS signals, such as MTC-PRS signals, after a timeframe for legacy PRS signal sub frames. In such instances, the base station uses existing protocols, such as LTE Positioning Protocol (LPP) or the like, to inform the UE of the existence of the specified number of sub-frames in the data transmission. In such embodiments of the invention, the UE and, specifically MTC devices in order to preserve battery life, may be configured to intermittently listen and process received MTC-PRS signals. In such embodiments, the UE may be configured to listen and process received MTC-PRS signals in response to cross-correlation output failing below a predetermined threshold.

A system for improved UE positioning accuracy in a mobile communication system defines first embodiments of the invention. The system includes a plurality of base stations that are configured to provide for boosting of transmit power to increase the signal Power Spectral Density (PSD) within a predetermined number of resource blocks or within the operating bandwidth around Direct Current (DC) sub-carrier, and transmit Positioning Reference Signal (PRS) transmissions that include positioning reference signals. The system additionally includes user equipment (UE) configured to listen for PRS transmissions within an operating bandwidth around Direct Current (DC) sub-carrier, perform Time of Arrival (TOA) measurements for a plurality of the base stations based on positioning reference signals in received PRS transmissions, obtain Observed Time Difference of Arrival (OTDOA) measurements by subtracting the TOA measurement from the plurality of base stations/eNode-Bs from the TOA of a reference base station/eNode-B, and transmit the OTDOA measurements. In LTE, TDOA measurement is also known as Reference Signal Time Different (RSTD) measurement. Additionally, the system includes a location server configured to receive the OTDOA measurements, via a base station, and perform a positioning estimation of the UE based on the OTDOA measurements.

In specific embodiments of the system, the plurality of base stations are further configured to provide for boosting of the transmit power to increase the signal Power Spectral Density (PSD) within six resource blocks or within the operating bandwidth of approximately 1.4 MHz (Megahertz).

In other specific embodiments of the system, the plurality of base stations are further configured to provide for boosting the transmit power to a predetermined power boosting level. While in other specific related embodiments of the system, the plurality of base stations are further configured to provide for boosting the transmit power by dynamically increasing the power boosting level based on the accuracy of the positioning estimation failing to meet the determined positioning accuracy threshold. Moreover, in other specific related embodiments, the plurality of base stations are further configured to provide for boosting the transmit power by iteratively and incrementally increasing the power boosting level in response to each instance of determining that the accuracy of the positioning estimation fails to meet the determined positioning accuracy threshold.

In additional specific embodiments of the system, the plurality of base stations are further configured to provide for de-boosting the transmit power to decrease the signal PSD within all resource blocks other than the predetermined number of resource blocks or outside the operating bandwidth around DC sub-carrier. In further specific related embodiments of the system, the plurality of base stations are further configured to provide for de-boosting the transmit power to decrease the signal PSD to partial resource blocks at edges of a system bandwidth.

In still further specific embodiments of the system, the plurality of base station are further configured to transmit PRS transmissions that include a second predetermined number of sub-frames that transmits second sub-frames that include Machine Type Communication (MTC)-PRS signals with limited bandwidth (e.g., MTC 1.4 MHz bandwidth) after a first predetermined number of sub-frames that transmits first sub-frames that include PRS signals. In such embodiments of the system, the UE may be further configured to listen for PRS transmissions intermittently, where an intermittent period for listening for the PRS transmission is dynamically determined based on a cross-correlation output that issued to determine RSTD measurements in an OTDOA positioning technique failing to meet a predetermined cross-correlation threshold.

A method for improved User Equipment (UE) positioning accuracy in a mobile communication system defines second embodiments of the invention. The method includes boosting, at base stations within the mobile communication system, transmit power to increase the signal Power Spectral Density (PSD) within a predetermined number of resource blocks or within the operating bandwidth around Direct Current (DC) sub-carrier. The method further includes transmitting, from the base stations, Positioning Reference Signal (PRS) transmissions that are received by UE listening for PRS transmissions within an operating bandwidth around sub-carrier. In response to the UE receiving the PRS transmissions, the UE performs Time of Arrival (TOA) measurements for each of the plurality of base stations from which PRS transmissions were received. The TOA measurements are determined based on positioning reference signals in the PRS transmissions. The UE calculates Observed Time Difference of Arrival (OTDOA) measurements by subtracting the TOA from the plurality of base stations/eNode-Bs from a TOA of a reference base station/eNode-B. Subsequently, the UE transmits the OTDOA measurements to a Location Server (LS) configured for performing positioning estimation of the UE based on the OTDOA measurements.

In specific embodiments of the method, boosting the transmit power further includes boosting the transmit power to increase the signal Power Spectral Density (PSD) within six resource blocks or within the operating bandwidth of approximately 1.4 MHz (Megahertz).

In other specific embodiments of the method, boosting the transmit power further includes boosting the transmit power to a predetermined power boosting level. While in other specific embodiments of the method, boosting the transmit power further includes dynamically increasing the power boosting level based on the accuracy of the positioning estimation failing to meet a predetermined positioning accuracy threshold. In further related embodiments of the method, boosting the transmit power further comprises iteratively and incrementally increasing the power boosting level in response to each instance of determining that the accuracy of the positioning estimation fails to meet the predetermined positioning accuracy threshold. In additional embodiments, decreasing the power boosting level, may occur in those instances in which the positioning accuracy is far above (i.e., exceeds) the predetermined positioning accuracy threshold (accuracy greater than the network requires).

In further specific embodiments the method include de-boosting, at the base stations within the mobile communication system, the transmit power to decrease the signal PSD (a) within all resource blocks other than the predetermined number of resource blocks or outside the operating bandwidth around DC sub-carrier or (b) partial resource blocks at edges of a system bandwidth.

In still further embodiments of the method, transmitting PRS transmissions further comprises transmitting PRS transmissions that include a second predetermined timeframe that transmits second sub-frames that include Machine Type Communication (MTC)-PRS signals after a first predetermined timeframe that transmits first sub-frames that include PRS signals.

A method for improved User Equipment (UE) positioning accuracy in a mobile communication system defines third embodiments of the invention. The method includes providing for a UE configured to listen for Positioning Reference Signal (PRS) transmissions within an operating bandwidth around Direct Current (DC) sub-carrier. The method further includes receiving, at the UE, PRS transmissions, wherein the PRS transmissions are transmitted from base stations with partially boosted power to increase the signal Power Spectral Density (PSD) within a predetermined number of resource blocks or within the operating bandwidth around DC sub-carrier, In addition, the method includes performing, at the UE, Time of Arrival (TOA) measurements for each of the plurality of base stations, wherein the TOA measurements are determined based on positioning reference signals in the PRS transmissions, obtain Observed Time Difference of Arrival (OTDOA) measurements by subtracting the TOA from the plurality of base stations/eNode-Bs from a TOA of a reference base station/eNode-B, and transmitting, from the UE to a Location Server (LS), the OTDOA measurements. Subsequently, the LS performs a positioning estimation of the UE based on the OTDOA measurements.

In specific embodiments of the method, providing for the UE further includes providing for a Machine Type Communications (MTC) UE configured to listen for the PRS transmissions within the operating bandwidth of approximately 1.4 MHz (Megahertz).

In other embodiments of the method the UE further comprises providing for the UE that listens for the PRS transmission intermittently, such that an intermittent period for listening for the PRS transmission is dynamically determined based on a cross-correlation output that issued to determine RSTD measurements in an OTDOA positioning technique failing to meet a predetermined cross-correlation threshold.

Thus, systems, apparatus, methods, and computer program products herein described in detail below provide for modifying Positioning Reference Signal (PRS) transmissions from base stations to User Equipment (UE) by providing for partial power boosting at the base stations with the purpose of improving UE positioning accuracy and, specifically positioning accuracy of Machine Type Communication (MTC) devices.

BRIEF DESCRIPTION OF THE DRAWINGS

Figure 1A:
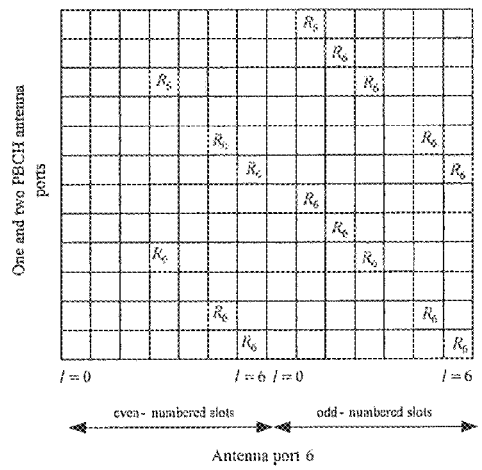
Figure 1B:
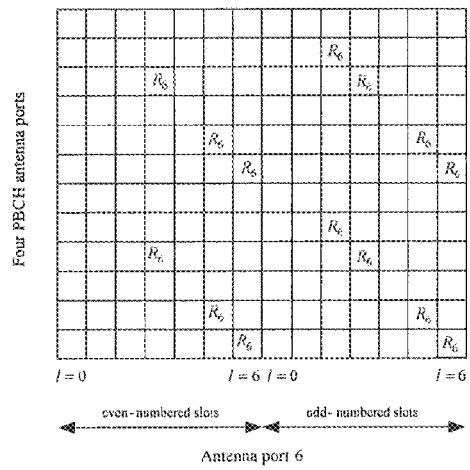
Figure 1C:
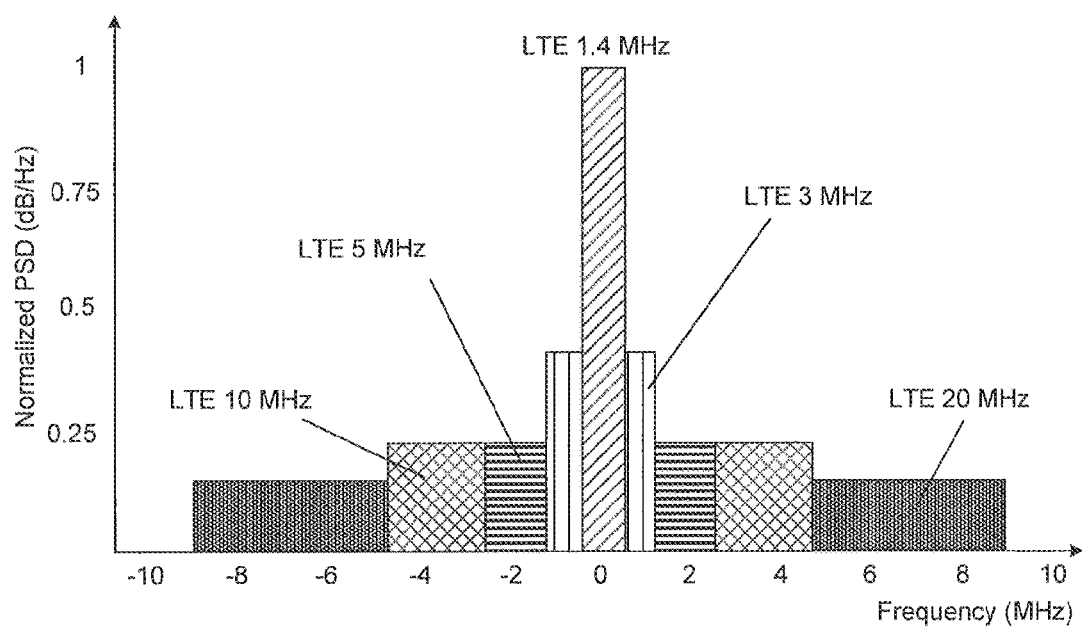
Figure 2:
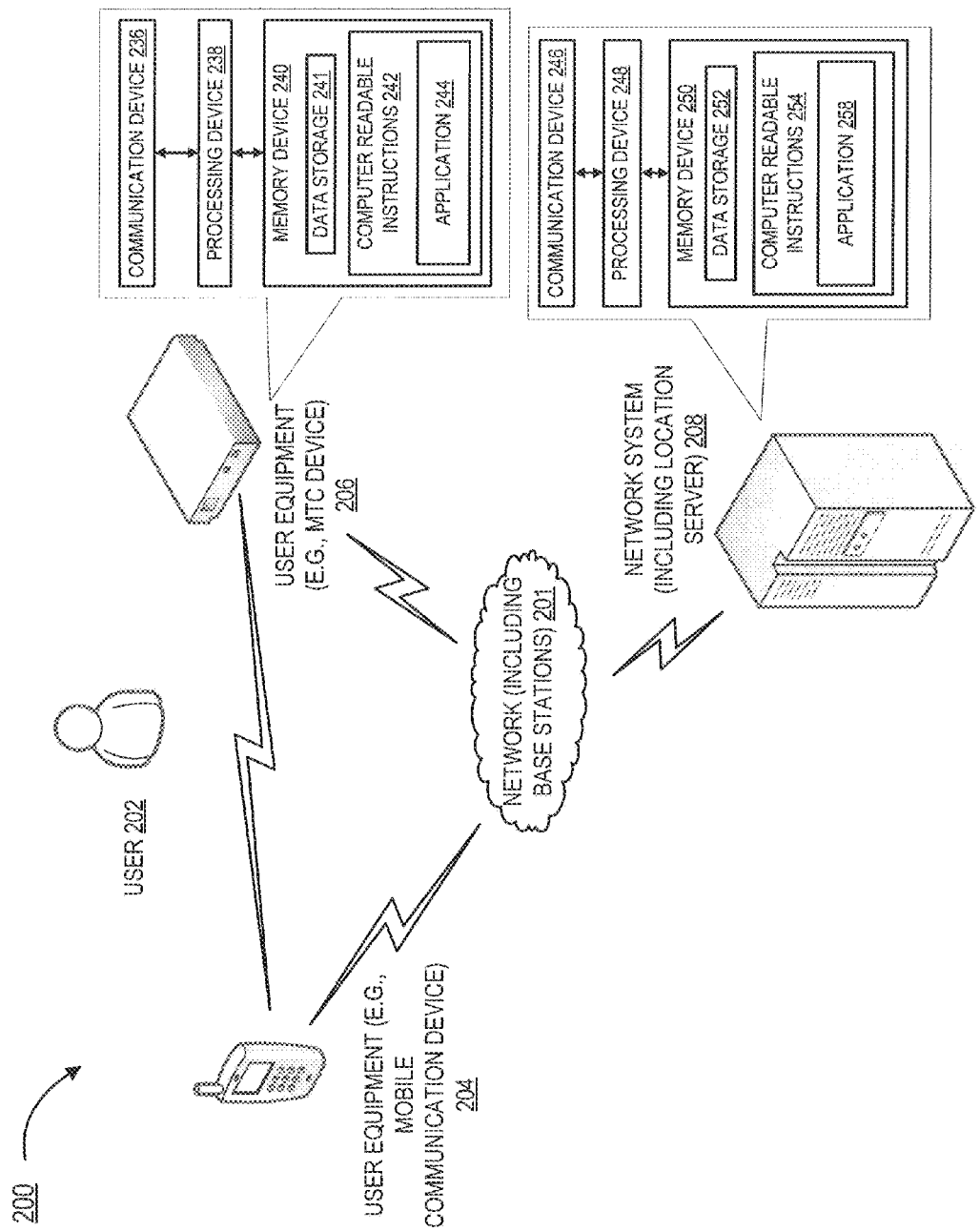
Figure 3:
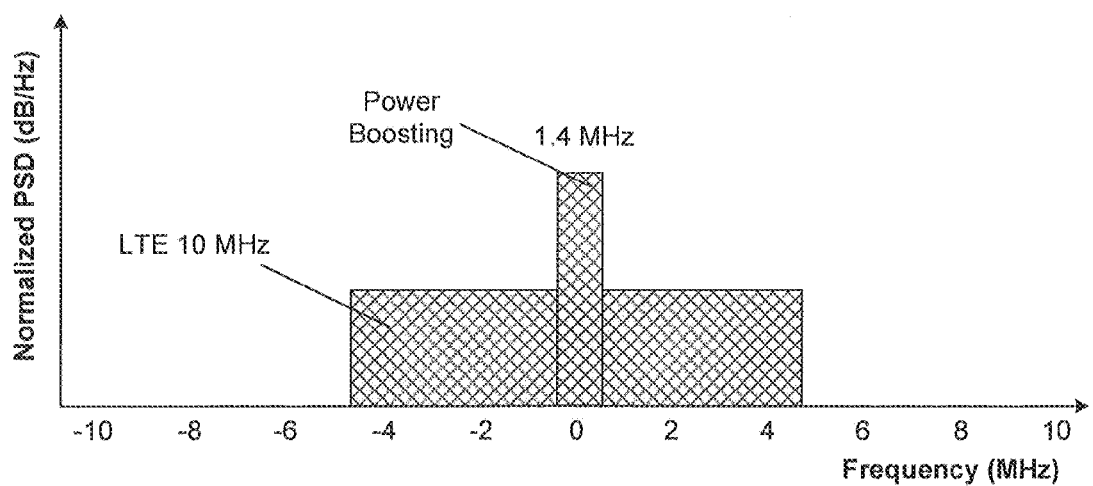
Figure 4:
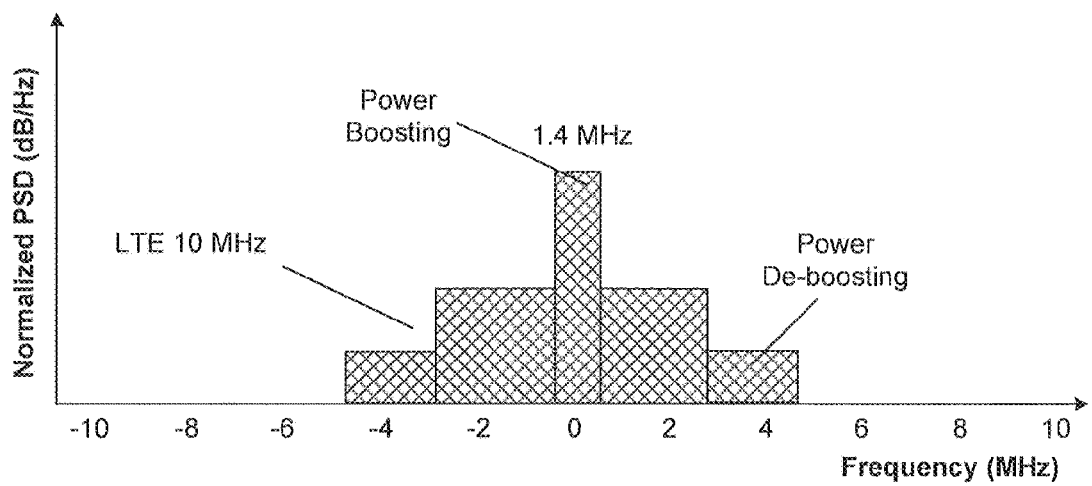
Figure 5:
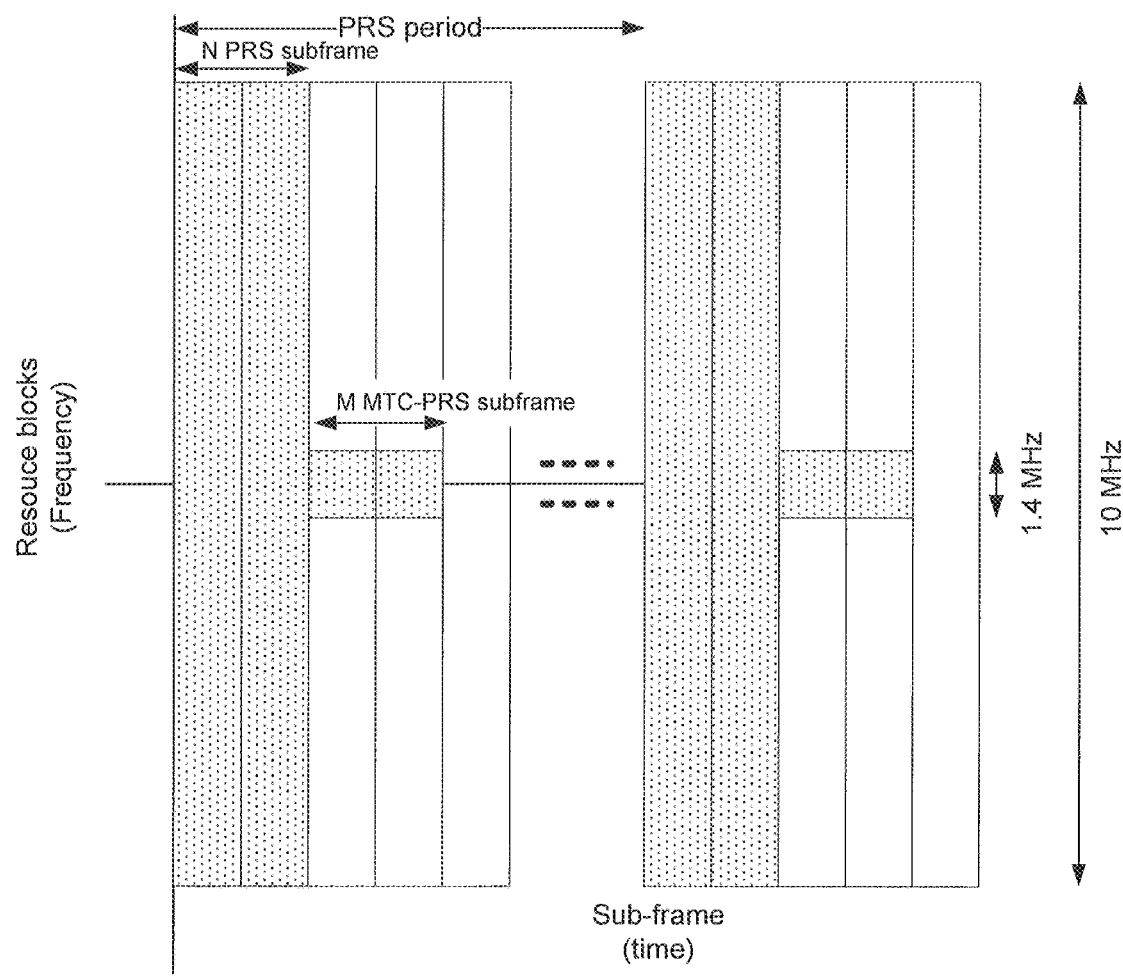

Having thus described embodiments of the invention in general terms, reference will now be made to the accompanying drawings, where:

FIGS. 1A and 1B are mappings of Positioning Reference Signals (PRS), in accordance with the prior art;

FIG. 1C is a graphical representation of normalized Power Spectral Density (PSD) in various LTE bandwidths, in accordance with the prior art;

FIG. 2 is a schematic diagram of a system for machine type communication, in accordance with embodiments of the present invention;

FIG. 3 is a graphical representation of a normalized PSD for partial power boosting of PRS signals, in accordance with embodiments of the present invention;

FIG. 4 is a graphical representation of a normalized PSD for partial power boosting and edge de-boosting of PRS signals, in accordance with embodiments of the present invention; and FIG. 5 illustrates transmission of Machine Type Communication (MTC)-PRS sub-frames within legacy PRS sub-frames of a base station data transmission, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

A device may be referred to as a node or user equipment ("UE"). For the purpose of sending or receiving data, the device may connect to a wireless local area network ("WLAN") or a mobile communication network (including evolution of 3GPP) LTE releases and $5^{th}$ Generation ("5G") LTE releases). Any network described herein may have one or more base stations ("BS") and/or access points ("AP").

As discussed in detail herein, the present invention provides for modifying Positioning Reference Signal (PRS) transmissions from base stations to User Equipment (UE) by providing for partial power boosting at the base stations with the purpose of improving UE positioning accuracy and, specifically positioning accuracy of Machine Type Communication (MTC) devices.

LTE networks deploy various positioning techniques as a means of determining the current position (i.e., geographic location) of the device/UE. One such positioning technique that is widely deployed in the LTE network is Observed Time Difference of Arrival (OTDOA), which is a Radio Access Technology (RAT) dependent positioning technique. In principle, OTDOA relies on the device/UE receiving PRS signals transmitted from multiple base stations (i.e., all base stations within the network transmit PRS signals, and the device/UE receives PRS signals from specified base stations depending on the UE's current location within the network).

FIGS. 1A and 1B illustrate PRS signal mapping in an LTE resource for both one or two transmit antenna ports (FIG. 1A) and four antenna ports (FIG. 1B), specifically PRS signal mapping in LTE specification 36.211. In the illustrated mappings the PRS symbol ($R_6$) has a diagonal pattern and is placed every sixth subcarrier, therefore; the PRS signal has a reuse factor of six. The sub-frame that contains the PRS signal is dedicated for PRS transmission to avoid interference (i.e., the sub-frame contains no other signals). It should be noted that the transmission of the PRS signal is reconfigurable. In this regard, the PRS signal can be transmitted across the entirety of the LTE system bandwidth. In addition, the PRS signal can be transmitted in N consecutive sub-frames with a certain duration of PRS periodicity, where N varies from 1 to 6 milliseconds (ms) and PRS periodicity varies from 160 to 1280 ms.

In response to receiving the PRS signals, the UE performs Time of Arrival (TOA) measurements. In accordance with specific embodiments of the invention, TOA measurements are calculated by performing cross-correlation on the received PRS signals and locally generated reference signals. Cross correlation from different transmission antennas, receiver antennas and sub-frames is accumulated for the purpose of obtaining exemplary cross-correlation peak. The measured time delay is subsequently determined from the phase information of the cross correlation peak. The previously described processes are repeated to obtain the time delay from several different base stations (e.g., a reference base station and neighboring base stations). OTDOA or Reference Signal Time Difference (RSTD) measurement is calculated by subtracting the time of arrival (TOA) of neighboring base stations from the TOA of the reference (i.e., serving) base station. In response to determining RSTD measurements, the device/UE performs RSTD measurement quality assessments, such as classifying the RSTD measurement or the like. The UE subsequently transmits all of the RSTD measurements, RSTD measurement quality information, and, in some embodiments UE device type (e.g., MTC device) to the Location Server, via a reference base station, using LTE Positioning Protocol (LPP). In response to receiving the RSTD measurements and quality information, the LS performs positioning estimations.

The LTE cellular system is commonly deployed with a bandwidth in the range of 10 MHZ or 20 MHz. In such a system, PRS signals are broadcasted by the base station throughout the bandwidth but the signal Power Spectral Density (PSD) is low. According to the 3GPP LTE specification the base station maximum transmit power are 43 dBm for LTE bandwidth less than or equal to MHz and 46 dBm for LTE bandwidth greater than 5 MHz. A graphical representation of the normalized power spectral density (dB/Hz) of an LTE signal with various LTE bandwidths is shown in FIG. 1C. As shown in FIG. 1C, the wider bandwidth (such as LTE 10 MHz, LTE 20 MHz and the like) has more PRS signals spread over the entire bandwidth but with signal PSD is comparatively low. Conversely, the narrow bandwidth (such as LTE 1.4 MHz) has fewer PRS signals but the signal PSD is relatively high.

Since MTC devices are targeted to be operated in the narrow 1.4 MHz bandwidth, with the objective of reduced power consumption and reduced implementation cost, such devices are only capable of receiving a part of the overall PRS signal that is usually typically transmitted in the wider bandwidth. Since the transmitted signal within the wider bandwidth has a relatively low PSD, an MTC device that operates, for example, in a LTE 10 MHz system receives a weaker signal than in the instance of the MTC device being operated in a LTE 1.4 MHz system. The weaker signals result is poor RSTD measurement quality (i.e., poor positioning measurements) and, thus, unacceptable positioning accuracy.

While many MTC devices may be configured as stationary devices that are not prone to movement, there are other instances where knowing the position of an MTC device is important. For example, MTC devices may be used within a business/corporation for inventory control; where knowing the equipment is located at any point in time is important. Additionally, MTC devices may act as tracking devices (e.g., wearables, bracelets or the like) attached to patients at a hospital or nursing care facility, children at a daycare facility or the like. Moreover, even in the event that an MTC is configured as a stationary device (e.g., affixed to building, stationary apparatus or the like) It should also be noted that due to the low cost constraints associated with MTC devices it may not feasible, in most instances, to equip MTC devices with other location-determining means, such Global Positioning System (GPS) or the like. In which case, for MTC devices position determination may, in many instances, be limited to methods that rely on positioning signals (i.e., triangulation methods or the like).

Referring now to FIG. 2, a diagram illustrates a User Equipment (UE), such as a Machine Type Communication (MTC) device, operating in an environment, in accordance with embodiments of the present invention. A network environment 200 is illustrated in accordance with one embodiment of the present invention. As illustrated in FIG. 2, the network system 208 is operatively coupled, via a network 201, which includes base stations/eNode-Bs, to the user equipment 204 and/or 206. In this configuration, the network system 208 may send information to and receive information from the user equipment devices 204 and/or 206, via network 201. In accordance with the present invention, the user equipment 204 and/or 206 are in network communication with base stations/e-NodeBs 201 and the base stations/e-NodeBs are in communication with network system 208 which includes a location server operatively configured to determine positioning estimations based on data sent from the user equipment 204 and 206, via base stations/e-NodeBs 201.

FIG. 2 illustrates only one example of an embodiment of a network environment 200, and it will be appreciated that in other embodiments one or more of the systems, devices, or servers may be combined into a single system, device, or server, or be made up of multiple systems, devices, or servers.

The network 201 may be a telecommunication network, a global area network (GAN), such as the Internet, a wide area network (WAN), a local area network (LAN), or any other type of network or combination of networks. The network 201 may provide for wireline, wireless, or a combination wireline and wireless communication between devices on the network 201. In some embodiments, the user 202 is an individual who maintains cellular products with one or more providers.

As illustrated in FIG. 2, the network system 208 may be or include one or more base stations and/or access points and, in some embodiments, generally includes a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201. As such, the communication device 246 generally includes a modem, server, or other device for communicating with other devices on the network 201, which may include, for example, transmitting reference signals to LTE devices.

As further illustrated in FIG. 2, the network system 208 includes computer-readable instructions 254 stored in the memory device 250, which in one embodiment includes the computer-readable instructions 254 of an application 258. In some embodiments, the memory device 250 includes data storage 252 for storing data related to and/or used by the application 258.

As illustrated in FIG. 2, the user equipment 206 (e.g., an MTC device) generally includes a communication device 236, a processing device 238, and a memory device 240. The processing device 238 is operatively coupled to the communication device 236 and the memory device 240. In some embodiments, the processing device 238 may send or receive data from the user equipment 204, and/or the network system 208 via the communication device 236 over a network 201. As such, the communication device 236 generally includes a modem, server, or other device for communicating with other devices on the network 201.

As further illustrated in FIG. 2, the user equipment 206 includes computer-readable instructions 242 stored in the memory device 240, which in one embodiment includes the computer-readable instructions 242 of an application 244. In the embodiment illustrated in FIG. 2, the application 244 allows the user equipment 206 to be linked to the network system 208 to communicate, via a network 201. The application 244 may also allow the user equipment 206 to connect directly (i.e., locally or device to device) with the user equipment 204. User equipment 204 (e.g., a mobile communication device, MTC device or the like) may include one or more components similar to those described with reference to user equipment 206.

It is understood that the servers, systems, and/or devices described herein illustrate one embodiment of the invention. It is further understood that one or more of the servers, systems, and devices can be combined in other embodiments and still function in the same or similar way as the embodiments described herein.

Embodiments of the present invention, provide for partial power boosting at the base station (also commonly referred to as eNode-B, base transceiver station or the like) so that the power boost increases signal PSD within a specified amount of Resources Blocks (RB) (e.g., 6 RB or the like) or within a narrow bandwidth (e.g., 1.4 MHz or the like) around DC (Direct Current) subcarrier (i.e., a subcarrier not containing data). By boosting the transmit power at the base station to increase the signal PSD within a narrow bandwidth, such as 1.4 MHz, MTC devices which, as discussed, are defined to be operated with a maximum bandwidth of 1.4 MHz, will receive a stronger signal. Thus, while the amount of PRS signals that a MTC device will receive will remain relatively low, the strength of the signal that the MTC device receives will be stronger and, therefore, the signals that are used in the OTDOA-based positioning techniques result in positioning estimates that are far more accurate than would be absent the boost in transmit power at the base station.

FIG. 3 provides a graphical illustration of power boosting in a system with a bandwidth of 10 MHz (e.g., LTE 10 MHz or the like) in which the power has been boosted within 1.4 MHz around DC sub-carrier. In the illustrated example of FIG. 3, the y-axis represents normalized PSD in dB/Hz and, as such, if we assume that within the 1.4 MHz bandwidth the power has been boosted to a normalized PSD value of 1.0, then normalized PSD in the remainder of the 10 MHz system bandwidth is approximately 0.5 (or 50% of the PSD in the 1.4 MHz bandwidth.

In specific embodiments of the invention, the base stations are configured to support multiple levels of power boosting. In specific embodiments of the invention, the partial power boosting at the base station is pre-configured and remains constant. In such embodiments of the invention, a communication standard or the like may define (i.e., pre-configure) the power boosting level implemented at each base station in the system.

While in other embodiments of the invention, the partial power boosting is dynamic and/or adaptive based on determined accuracy of positioning estimates. In certain embodiments, the Location Server (LS) classifies the UE device type (e.g., MTC device type, other device types and the like) and the LS is configured to collect and analyze the RSTD (Reference Signal Time Difference) measurements and the RSTD quality information reported from numerous UEs (e.g., numerous UEs of a specified device type, such as MTC devices), which used a specified base station in determining their RSTD measurements. The LS may use the RSTD quality information to determine an overall accuracy for a given base station. In specific embodiments of the invention, a positioning accuracy value may be calculated that associated with a specific base station and the positioning accuracy value is compared to a predetermined threshold value. In the event that the positioning accuracy value fails to meet (or, depending on configuration, exceeds and/or is equal to) the predetermined threshold value (depending on whether the threshold value is associated with acceptable accuracy or unacceptable accuracy), the LS is configured to send a power boost signal/command to the specific base station associated with the positioning accuracy value that instructs the base station to increase the power boosting level. For example, the RSTD quality information may indicate that 65% of the UEs (e.g., MTC devices) that received positioning signals for a specific base station report or are determined to have poor positioning accuracy. The predetermined threshold value may be set at 60%, such that if 60% or greater of the devices are experiencing poor positioning accuracy an increase in the power boosting level is warranted. In the example provided, since 65% of the UEs indicate poor positioning accuracy, a signal/command is communicated, from the LS to the specific base station, which has the effect of increasing the power boosting level at the specific base station.

In specific embodiments of the invention, base stations may be configured for a one-step/level increase in power boosting level (e.g., increase from a low (i.e., first) power boost level to a high (i.e., second power boost level). In other specific embodiments of the invention the base stations may be configured to allow for multiple steps/levels. In such embodiments in which the base station is configured for multiple steps/levels, an increase in a power boost level may be warranted based on repeated/continual instances of the positioning accuracy indicating unacceptable positioning accuracy (in the example, described above, greater than 60% of the UEs receiving positioning signals from the specific continue to exhibit poor positioning accuracy and, as such, the power boosting level at the base station will be increased further (i.e., the power boost level of base station A is initially increased from a first power boost level to a second power boost level, and based on continual poor positioning accuracy at base station A the power boost level is further increased from the second power boost level to a third power boost level, and so on. In other embodiments of the invention, more than one positioning accuracy threshold value may exist, such that each threshold is associated with a different power boost level (or, stated differently, the degree to which the base station's positioning accuracy value fails to meet/or exceeds the positioning accuracy threshold may determine which level of power boosting is applicable, e.g., 90% of the UEs exhibit poor positioning accuracy a higher level increase in power boosting is applicable as opposed to 65% of the UEs exhibiting poor positioning accuracy which would result in a lower level increase in power boosting is applicable.

It should also be noted that the positioning accuracy thresholds may be used to determine decreases in the power boosting levels. The positioning accuracy thresholds may be the same threshold values used to determine if an increase in the power boosting level is required, or, in other embodiments, different positioning accuracy thresholds may be established to determine when a decrease in the power boost level is required. For example, if the power boosting accuracy threshold is set at 60% and the UEs are currently experiencing 50% (and, in some embodiments, the level of power boosting was previously increased due to poor accuracy), the power boosting level at the base station may be decreased. While in another example, in which an increase in power boosting level is required if poor accuracy is greater than 65%, a separate power boosting accuracy threshold may be set at 20% such that less than 20% of the UEs must be exhibiting poor positioning accuracy in order for decreasing the power boost level at the base station. In addition, determining if decreasing the power boost level is applicable may take into account whether the base station has previously undergone an increase in power boosting level.

Moreover, in other specific embodiments of the invention, since in most instances the base station is required to maintain the same transmit power, the base station may be configured to implement both power boosting and power de-boosting as the means for compensating for higher power in certain resource blocks due to the power boosting. In specific embodiments, power de-boosting may be distributed equally across all of the resource blocks that have not been designated for an increase in PSD. In other specific embodiments, as shown in FIG. 4, power de-boosting is allocated to partial resource blocks at the edges of the bandwidth. As shown in FIG. 4, in a LTE 10 MHz system, de-boosting is allocated to those partial resource blocks at the edges in the 8-10 MHz bandwidth range.

In other embodiments of the invention, in addition to increasing the PSD by partial power boosting or in lieu of partial power boosting, the base station may be configured to increase the volume of PRS signals by transmitting a specified timeframe of sub-frames of device-specific PRS signals, such as MTC-PRS signals, after a timeframe for legacy PRS signal sub frames. See, for example, FIG. 5 which is illustrative of Machine Type Communication (MTC)-PRS sub-frames within legacy PRS sub-frames of a base station data transmission. In the illustrated example, two MTC-PRS sub-frames broadcast in the narrow 1.4 MHz bandwidth follow after the conventional PRS sub-frames that broadcasted across the system bandwidth, which in the illustrated example is 10 MHz. In such embodiments of the invention, the base station uses existing protocols, such as LTE Positioning Protocol (LPP) or the like, to inform the UE of the existence of the specified number of sub-frames in the data transmission. Moreover, in such embodiments of the invention, it should be noted that the PSS/SSS (Primary Synchronization Signals/Secondary Synchronization Signals) sub-frames and MBSFN (Multicast Broadcast Single Frequency Network) sub-frames include no Positioning Reference Signals (PRSs).

In such embodiments of the invention, the UE and, specifically MTC devices in order to preserve battery life, may be configured to intermittently listen and process received MTC-PRS signals. In such embodiments, the UE may be configured to listen and process received MTC-PRS signals in response to cross-correlation output, which is used to determine RSTD measurements in the OTDOA positioning technique, failing below a predetermined threshold. For example, if the cross-correlation output is above a predetermined cross-correlation threshold, then the UE/MTC device can stop the RSTD measurement process and, at a later point in time, report OTDOA results (e.g., RSTD measurements and quality information) to the location server, via the base station, using the LPP protocol.

Thus, systems, apparatus, methods, computer program products and the like described above provide for modifying Positioning Reference Signal (PRS) transmissions from base stations to User Equipment (UE) by providing for partial power boosting at the base stations with the purpose of improving UE positioning accuracy and, specifically positioning accuracy of Machine Type Communication (MTC) devices. Specifically, the transmit power at the base stations is boosted so that it increases the signal power spectral density within a few resource blocks or small bandwidth (i.e., MTC bandwidth) around DC sub-carrier. The level of power-boosting may be pre-configured or the level may be dynamic/adaptive based on conditions in the network, such that if UE positioning accuracy associated with a specified base station is determined to be poor, that specific base station may increase the power boost level. In addition, in order to maintain the same overall transmit power, the invention may include de-boosting to compensate for the higher power in certain resource blocks. De-boosting may be allocated across all other resource blocks or to partial resource blocks at the edges of the system bandwidth. In additional embodiments of the invention, in addition to or in lieu of power boosting, the PRS transmission may be re-configured to allow for M sub-frames of UE-specific (e.g., MTC device)-PRS signals with limited bandwidth (i.e. MTC bandwidth) after the conventional N PRS signals, thereby increasing the volume of PRS signals received by the UE.

The invention is not limited to any particular types of devices (either Machine Type Communication (MTC) devices or non-MTC devices). As used herein, a device may also be referred to as a UE, a system, or apparatus. Examples of devices include mobile phones or other mobile computing devices, mobile televisions, laptop computers, smart screens, tablet computers or tablets, portable desktop computers, e-readers, scanners, portable media devices, gaming devices, cameras or other image-capturing devices, headgear, eyewear, watches, bands (e.g., wristbands) or other wearable devices, or other portable computing or non-computing devices.

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory ("RAM") having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

The various features described with respect to any embodiments described herein are applicable to any of the other embodiments described herein. As used herein, the terms data and information may be used interchangeably. Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory ("ROM"), an erasable programmable read-only memory ("EPROM" or Flash memory), a compact disc read-only memory ("CD-ROM"), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable information processing apparatus in order to produce a particular machine, such that the one or more computer-executable program code portions, which execute via the processor of the computer and/or other programmable information processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable information processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable information processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for improved UE positioning accuracy in a mobile communication system; the system comprising:
 a plurality of base stations configured to provide for
  boosting of transmit power to increase the signal Power Spectral Density (PSD) within a predetermined number of resource blocks or within an operating bandwidth around Direct Current (DC) sub-carrier and transmit Positioning Reference Signal (PRS) transmissions that include PRSs;

user equipment (UE) configured to listen for the PRS transmissions within an operating bandwidth around Direct Current (DC) sub-carrier, perform Time of Arrival (TOA) measurements for a plurality of the base stations based on PRSs in received PRS transmissions, obtain Observed Time Difference of Arrival (OTDOA) measurements by subtracting the TOA measurements from the plurality of the base stations from a TOA of a reference base station, and transmit the OTDOA measurements;

a location server configured to receive the OTDOA measurements, via a base station, and perform a positioning estimation of the UE based on the OTDOA measurements; and wherein the plurality of base stations are further configured to incrementally boost the transmit power in response to each instance of determining that an accuracy of the positioning estimation fails to meet a predetermined positioning accuracy threshold.

2. The system of claim 1, wherein the plurality of base stations are further configured to provide for boosting of the transmit power to increase the signal Power Spectral Density (PSD) within six resource blocks or within the operating bandwidth of approximately 1.4 MHz (Megahertz).

3. The system of claim 1, wherein the plurality of base stations are further configured to provide for boosting the transmit power to a predetermined power boosting level.

4. The system of claim 1, wherein the plurality of base stations are further configured to provide for boosting the transmit power by dynamically and iteratively increasing a power boosting level based on the accuracy of the positioning estimation failing to meet the predetermined positioning accuracy threshold.

5. The system of claim 1, wherein the plurality of base stations are further configured to provide for decreasing a power boosting level in response to determining that the accuracy of the positioning estimation exceeds the predetermined positioning accuracy threshold by a predetermined amount, wherein exceeds the predetermined positioning accuracy threshold is defined as having greater accuracy than is required by the network.

6. The system of claim 1, wherein the plurality of base stations are further configured to provide for de-boosting the transmit power to decrease the signal PSD within all resource blocks other than the predetermined number of resource blocks or outside the operating bandwidth around DC sub-carrier.

7. The system of claim 1, wherein the plurality of base stations are further configured to provide for de-boosting the transmit power to decrease the signal PSD to partial resource blocks at edges of a system bandwidth.

8. The system of claim 1, wherein the plurality of base station are further configured to transmit PRS transmissions that include a second predetermined quantity of sub-frames that transmits second sub-frames that include Machine Type Communication (MTC)-PRS signals after a first predetermined quantity of sub-frames that transmits first sub-frames that include PRS signals.

9. The system of claim 8, wherein the UE is further configured to listen for PRS transmissions intermittently, where an intermittent period for listening for the PRS transmission is dynamically determined based on a cross-correlation output that issued to determine Reference Signal Time Difference (RSTD) measurements in an OTDOA positioning technique failing to meet a predetermined cross-correlation threshold.

10. A method for improved User Equipment (UE) positioning accuracy in a mobile communication system, the method comprising:

boosting, at base stations within the mobile communication system, transmit power to increase the signal Power Spectral Density (PSD) within a predetermined number of resource blocks or within an operating bandwidth around Direct Current (DC) sub-carrier;

transmitting, from the base stations, Positioning Reference Signal (PRS) transmissions that are received by UE listening for PRS transmissions within an operating bandwidth around sub-carrier;

wherein the UE performs Time of Arrival (TOA) measurements for each of the plurality of base stations from which PRS transmissions were received, wherein the TOA measurements are determined based on positioning reference signals in the PRS transmissions, wherein the UE obtains Observed Time Difference of Arrival (OTDOA) measurements by subtracting a TOA from the plurality of base stations from a TOA of a reference base station, and wherein the UE transmits the OTDOA measurements to a Location Server (LS) configured for performing a positioning estimation of the UE based on the OTDOA measurements; and wherein the boosting of the transmit power at the base stations occurs incrementally in response to each instance of determining that an accuracy of the positioning estimation fails to meet a predetermined positioning accuracy threshold.

11. The method of claim 10, wherein boosting the transmit power further comprises boosting, at the base stations within the mobile communication system, transmit power to increase the signal Power Spectral Density (PSD) within six resource blocks or within the operating bandwidth of approximately 1.4 MHz (Megahertz).

12. The method of claim 10, wherein boosting the transmit power further comprises boosting the transmit power to a predetermined power boosting level.

13. The method of claim 10, wherein boosting the transmit power further comprises dynamically and iteratively increasing a power boosting level based on the accuracy of the positioning estimation failing to meet the predetermined positioning accuracy threshold.

14. The method of claim 10, further comprising decreasing a power boost level in response to determining that the accuracy of the positioning estimation exceeds the predetermined positioning accuracy threshold by a predetermined amount, wherein exceeds the predetermined positioning accuracy threshold is defined as having greater accuracy than is required by the network.

15. The method of claim 10, further comprising de-boosting, at the base stations within the mobile communication system, the transmit power to decrease the signal PSD (a) within all resource blocks other than the predetermined number of resource blocks or outside the operating bandwidth around DC sub-carrier or (b) partial resource blocks at edges of a system bandwidth.

16. The method of claim 10, wherein transmitting PRS transmissions further comprises transmitting PRS transmissions that include a second predetermined timeframe that transmits second sub-frames that include Machine Type Communication (MTC)-PRS signals after a first predetermined timeframe that transmits first sub-frames that include PRS signals.

* * * * *